US010107352B2

(12) United States Patent
Grzesik et al.

(10) Patent No.: US 10,107,352 B2
(45) Date of Patent: Oct. 23, 2018

(54) HYDRAULIC DAMPER WITH A HYDRAULIC STOP ARRANGEMENT

(71) Applicant: BeijingWest Industries Co., Ltd., Beijing (CN)

(72) Inventors: Radoslaw Pawel Grzesik, Cracow (PL); Piotr Andrzej Flacht, Cracow (PL)

(73) Assignee: BeijingWest Industries Co., Ltd., Beijing (CN)

( * ) Notice: Subject to any disclaimer, the term of this patent is extended or adjusted under 35 U.S.C. 154(b) by 0 days.

(21) Appl. No.: 15/471,275

(22) Filed: Mar. 28, 2017

(65) Prior Publication Data

US 2017/0314636 A1 Nov. 2, 2017

Related U.S. Application Data

(60) Provisional application No. 62/329,517, filed on Apr. 29, 2016.

(51) Int. Cl.
*F16F 9/32* (2006.01)
*F16F 9/58* (2006.01)
*F16F 9/348* (2006.01)

(52) U.S. Cl.
CPC ............ *F16F 9/585* (2013.01); *F16F 9/3221* (2013.01); *F16F 9/3257* (2013.01); *F16F 9/3482* (2013.01)

(58) Field of Classification Search
CPC ........ F16F 9/585; F16F 9/3482; F16F 9/3221; F16F 9/3257
See application file for complete search history.

(56) References Cited

U.S. PATENT DOCUMENTS

| 3,175,645 A | 3/1965 | Schafer et al. |
| 3,447,644 A | 6/1969 | Duckett |
| 3,865,356 A | 2/1975 | Wossner |

(Continued)

FOREIGN PATENT DOCUMENTS

| CN | 102207159 | 3/2011 |
| CN | 105370789 | 12/2015 |

(Continued)

OTHER PUBLICATIONS

European Search Report dated Oct. 5, 2017 (5 Pages).

*Primary Examiner* — Vishal R Sahni
(74) *Attorney, Agent, or Firm* — William H. Honaker; Dickinson Wright PLLC

(57) ABSTRACT

A hydraulic damper for a motor vehicle including a tube having a main section and a narrowed section. A main piston assembly is disposed inside the main section. A main piston rod is attached to the main piston assembly. A secondary rod is coupled with the main piston rod. A spring seat is disposed about the secondary rod. A spring engages the spring seat and preloads the spring seat. A secondary piston is disposed about and coupled with the secondary rod. The secondary piston has an axial projection and an annular projection that abuts the spring seat. The annular projection defines a plurality of axial slots. A retaining member is fixed to the secondary rod and has an outer face defining a plurality of radial slots. A sealing ring is slidably disposed about the axial projection. An annular channel is defined radially between the sealing ring and the axial projection.

10 Claims, 3 Drawing Sheets

(56) References Cited

U.S. PATENT DOCUMENTS

| | | | |
|---|---|---|---|
| 4,230,309 A | 10/1980 | Schnitzius | |
| 5,157,806 A | 10/1992 | Wartian | |
| 6,042,091 A * | 3/2000 | Marzocchi | B60G 15/061 |
| | | | 188/282.9 |
| 6,776,269 B1 | 8/2004 | Schel | |
| 2001/0006135 A1 | 7/2001 | Sasse et al. | |
| 2002/0053493 A1 | 5/2002 | Sintorn et al. | |
| 2005/0077131 A1 | 4/2005 | Russell | |
| 2006/0016650 A1 | 1/2006 | Kneip et al. | |
| 2011/0017558 A1 | 1/2011 | Nygren et al. | |
| 2012/0061194 A1 | 3/2012 | Yu | |
| 2015/0204411 A1 * | 7/2015 | Kus | F16F 9/49 |
| | | | 188/313 |
| 2015/0247549 A1 * | 9/2015 | Takeno | F16F 9/49 |
| | | | 188/297 |
| 2016/0091046 A1 * | 3/2016 | Soromenho | F16F 9/49 |
| | | | 188/297 |

FOREIGN PATENT DOCUMENTS

| | | |
|---|---|---|
| DE | 8130523 | 2/1982 |
| DE | 10317190 | 4/2003 |
| DE | 102005009762 | 3/2005 |
| DE | 102005030403 | 6/2005 |
| EP | 0565832 | 2/1993 |
| EP | 0753684 | 1/1997 |
| EP | 1944402 | 7/2008 |
| EP | 2302252 | 3/2011 |
| EP | 2366915 | 9/2011 |
| EP | 2302252 | 11/2012 |
| EP | 2952775 | 9/2015 |
| FR | 2974609 | 4/2011 |
| GB | 1143584 | 2/1969 |

\* cited by examiner

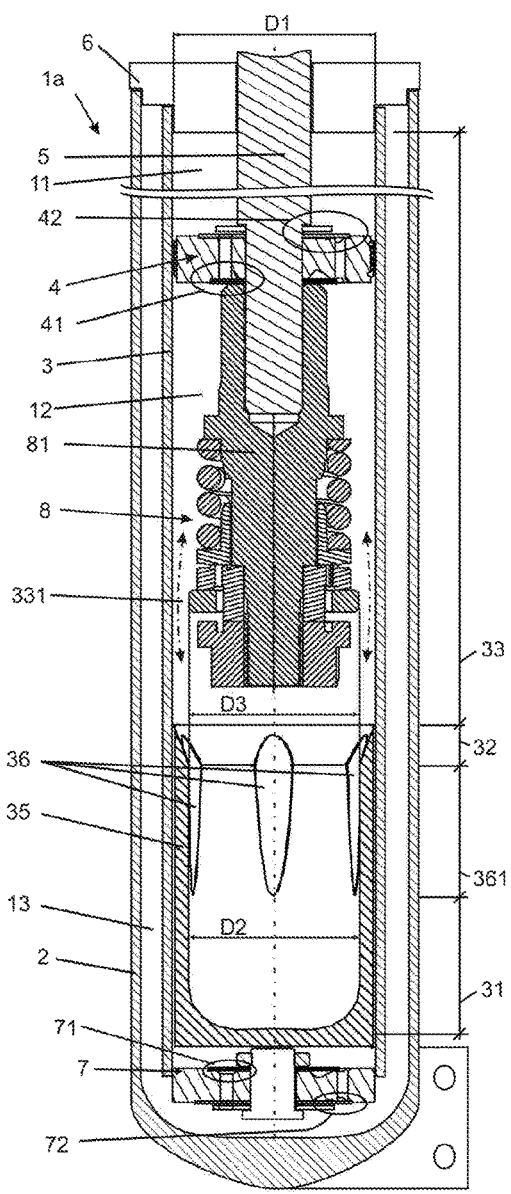
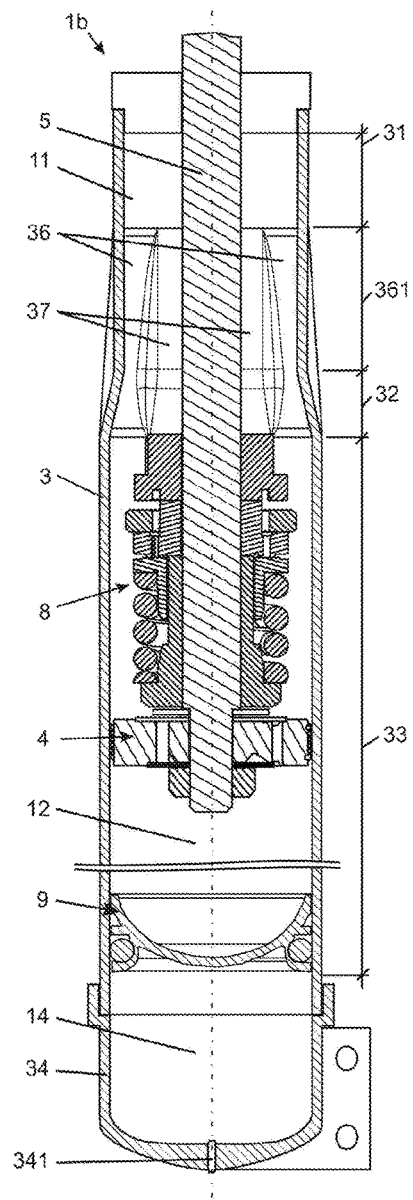
Fig. 1
Fig. 2

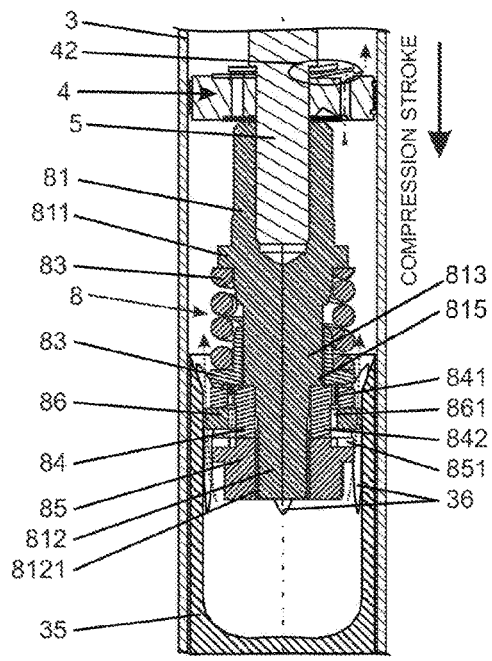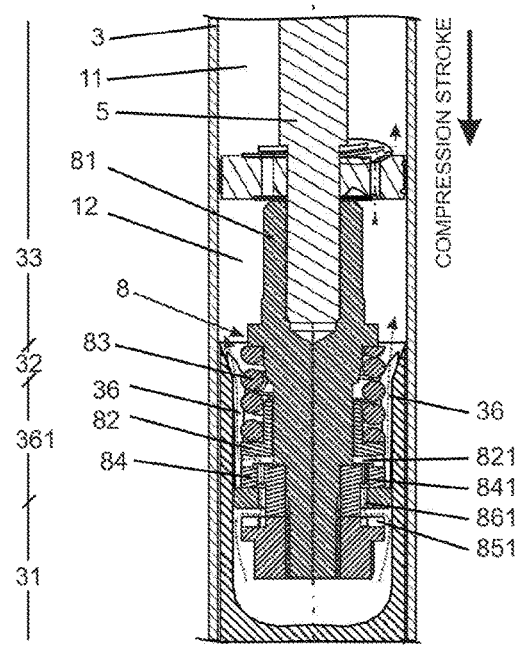
Fig. 3a  Fig. 3b
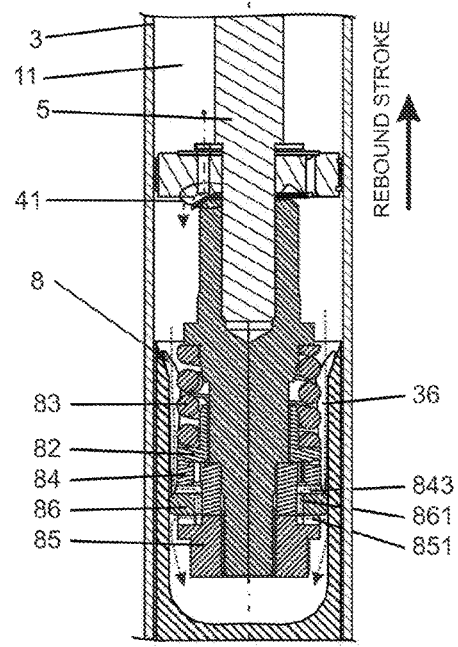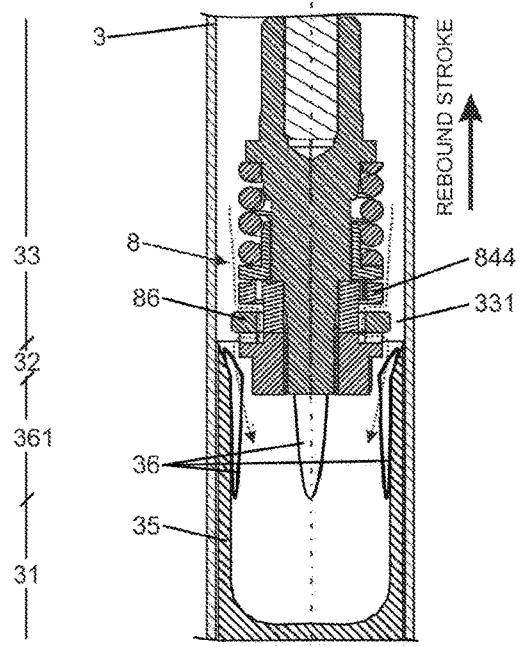
Fig. 4a  Fig. 4b

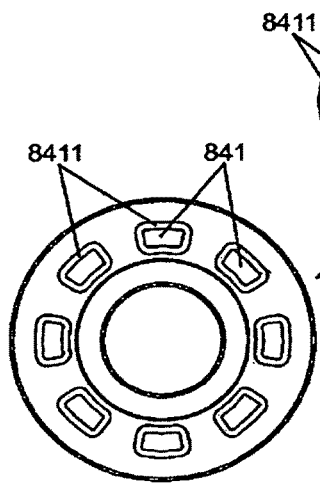 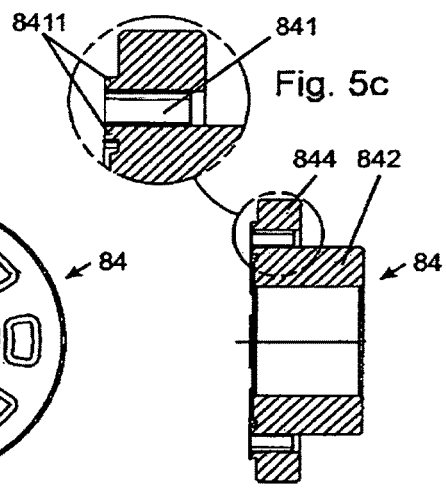 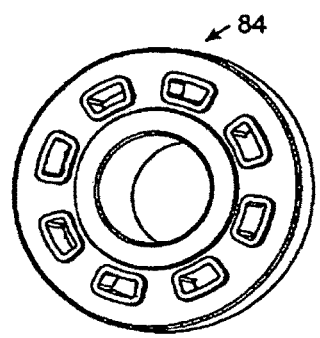
Fig. 5a  Fig. 5b  Fig. 5d
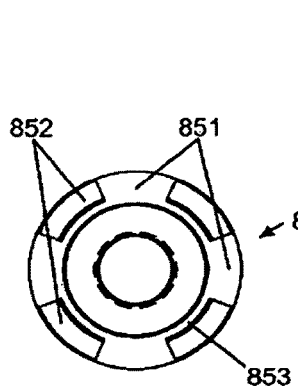 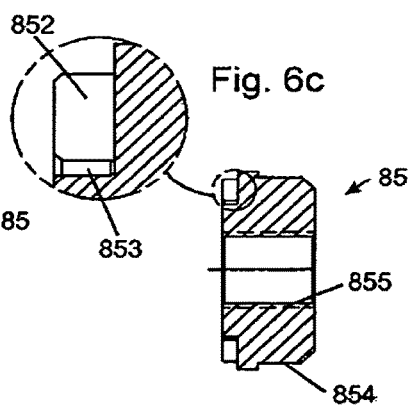 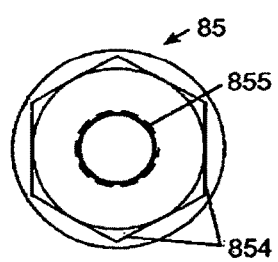
Fig. 6a  Fig. 6b  Fig. 6d

HYDRAULIC DAMPER WITH A HYDRAULIC STOP ARRANGEMENT

CROSS REFERENCE TO RELATED APPLICATION

This application claims the benefit of U.S. Provisional Patent Application Ser. No. 62/329,517 filed on Apr. 29, 2016, and titled "HYDRAULIC DAMPER WITH A HYDRAULIC STOP ARRANGEMENT", the entire disclosure of which is hereby incorporated by reference.

TECHNICAL FIELD

The invention relates to a hydraulic damper for a vehicle. More particularly, the invention relates to a hydraulic damper for a vehicle including a main piston assembly and a secondary piston assembly.

BACKGROUND OF THE INVENTION

It is known in the art for hydraulic dampers to include a main piston assembly in a main section of a tube of the damper, and a secondary piston assembly in a narrowed section of the tube. The secondary piston assembly forms a so called hydraulic stop arrangement that generates additional damping force over a predefined end section of an operating range of piston rod travel. Exemplary dampers provided with such a hydraulic stop arrangements are disclosed in U.S. Pat. No. 3,447,644 and European Patent Application Pub. Nos. EP 2 302 252A2 and EP 2 952 775A2.

Such hydraulic stop arrangements enable the generation of an additional damping force depending mainly on the position of the piston rod and provide a progressive increase of damping force based on rod displacement. The increase of a damping force in such solutions may, in certain cases, be excessively abrupt. Accordingly, it has been proposed to provide the secondary piston assembly with an additional compression valve assembly that makes the additional damping force generated by a stop arrangement dependent also on the rod speed.

An exemplary damper of this type is described in U.S. Patent Appln. Pub. No. US 2011/017558 which discloses a hydraulic compression stop piston that includes a main element having ducts, a flow limiting disc spring covering the ducts, and working in the motion of the compression piston, a flow limiter that covers the ducts with the expansion, stop washers, and limiting parts.

Nonetheless, all such known hydraulic stops feature the progressive characteristic of the additional damping force in the whole operating range of a stop. Although such a progressive characteristic is advantageous, it also generates a high risk of generating excessive damping forces which may induce extremely high loads to various damper components (in particular components of the hydraulic stop arrangement itself) and other structural vehicle components which may be damaged.

In view of the foregoing, it is an object of the present invention to provide a hydraulic damper with a hydraulic stop arrangement that provides a high and progressive increase of damping force based on rod displacement while also limiting an increase of damping forces above a certain tunable threshold. It is another object of the invention that the damper is of a simple construction, cost efficient and simple to manufacture.

SUMMARY OF THE INVENTION

A hydraulic damper for a motor vehicle is provided. The hydraulic damper includes a tube extending along an axis and defining a chamber for holding a fluid. The tube has a main section having a first diameter and a narrowed section having a second diameter being smaller than the first diameter. A main piston assembly is slidably disposed inside the main section of the tube. A main piston rod is attached to the main piston assembly and extends axially outside of the tube. A secondary rod is coupled with and extends axially from the main piston rod. A spring seat is disposed about the secondary rod and is axially moveable relative to the secondary rod. A spring engages the spring seat and preloads the spring seat in a direction opposite the main piston assembly. A secondary piston is disposed about and coupled with the secondary rod. The secondary piston has an axial projection and an annular projection. The axial projection extends axially and the annular projection extends radially outwardly relative to the axial portion and abuts the spring seat. The annular projection defines a plurality of axial slots that extend axially therethrough. A retaining member is fixed to the secondary rod on the axially opposite side of the secondary piston as the spring seat and has an outer face defining a plurality of spaced radial slots extending radially inwardly into radial alignment with the axial slots of the secondary piston. A sealing ring that has an external diameter substantially corresponding to the second diameter is slidably disposed about the axial projection axially between the annular projection and the retaining member. An annular channel is defined radially between the sealing ring and the axial projection. The sealing ring is axially moveable between a first position and a second position. The sealing ring engages the annular projection in the first position to fluidly connect the annular channel with the axial slots of the annular projection, and wherein the sealing ring engages the retaining member in the second position to fluidly connect the annular channel with the radial slots of the retaining member.

Accordingly, when the secondary piston assembly enters the narrowed section of the tube at the end of the stroke, working liquid flowing to the axial slots of the annular projection builds pressure under the spring seat so that at a certain point the spring will squeeze and open additional flow channels for the working fluid through the axial slots of the piston and axially below the spring seat.

According to another aspect of the disclosure, a plurality of annular seats each extend axially from the axial projection and surround one of the axial slots. The annular seats reduce the pressure area working at the spring seat and in turn allow for employing a spring that has a low stiffness.

According to another aspect of the disclosure, the secondary piston is fixed to the secondary rod.

According to another aspect of the disclosure, the secondary rod includes a main body portion and an axial extension portion that extends axially from the main body portion. The axial extension portion has a smaller diameter than the main body portion. An abutment surface is defined radially between the main body portion and the axial extension portion. The secondary piston engages the abutment surface.

According to another aspect of the disclosure, the axial extension portion of the secondary rod presents external threads, and the retaining member is a nut that is threadedly secured to the external threads of the axial extension portion.

According to another aspect of the disclosure, an annular projecting portion extends radially outwardly from the secondary rod. The spring engages the annular projecting portion.

It should be appreciated that the aforementioned aspects simplify the construction of the subject hydraulic damper, particularly the components associated with the secondary piston assembly.

According to another aspect of the disclosure, the tube extends axially between a rebound end and a compression end, and the narrowed section of the tube is located at the compression end of the tube.

According to another aspect of the disclosure, the narrowed section of the tube defines at least one slot that extends axially. It should be appreciated that the slot provides a smooth and adjustable increase of damping force while the secondary piston assembly enters the narrowed section of the damper tube.

According to another aspect of the disclosure, an insert is disposed in the compression end of the tube. The insert defines the narrowed section of the tube. Such a construction may withstand substantially higher pressure of the working liquid as compared to a single tube appropriately shaped to form the narrowed section. More particularly, high pressure builds up rapidly when the liquid may no longer flow around the sealing ring, in particular if the narrowed section is provided with axial slots and the secondary piston reaches the point when the slots are no longer present.

The hydraulic damper according to the present invention may easily be configured to generate additional damping force both for compression and rebound strokes enabling for wide range tuning of the force gains, wherein the performance of the arrangement may depend both on the piston position as well as on the piston velocity. The secondary piston may be easily configured to activate at the certain pressure activation threshold and thus function as a blow off safety valve.

BRIEF DESCRIPTION OF THE DRAWINGS

The invention shall be described and explained below in connection with the attached drawings on which:

FIG. 1 is a schematic cross-sectional view of an embodiment of a twin-tube damper according to the present invention with a hydraulic compression stop;

FIG. 2 is a schematic cross-sectional view of an embodiment of a mono-tube damper according to the present invention with a hydraulic rebound stop;

FIG. 3A is a schematic cross-sectional view illustrating the operation of a hydraulic compression stop of the twin-tube damper shown in FIG. 1 during a compression stroke;

FIG. 3B is a schematic cross-sectional view illustrating further operation of the hydraulic compression stop of the twin-tube damper shown in FIG. 1 during the compression stroke;

FIG. 4A is a schematic cross-sectional view illustrating the operation of a hydraulic compression stop of the twin-tube damper shown in FIG. 1 during a rebound stroke;

FIG. 4B is a schematic cross-sectional view illustrating further operation of the hydraulic compression stop of the twin-tube damper shown in FIG. 1 during the rebound stroke;

FIG. 5A illustrates an embodiment of a piston of a secondary piston assembly of a damper according to the present invention in front view;

FIG. 5B illustrates an embodiment of the piston of the secondary piston assembly of the damper according to the present invention in side cross-section along;

FIG. 5C is a magnified side cross-sectional view of an axial slot of the piston of FIG. 5B;

FIG. 5D illustrates an embodiment of the piston of the secondary piston assembly of the damper according to the present invention in a perspective front view;

FIG. 6A illustrates an embodiment of a retaining member of a secondary piston assembly of a damper according to the present invention in front view;

FIG. 6B illustrates an embodiment of the retaining member of the secondary piston assembly of the damper according to the present invention in side cross-section along;

FIG. 6C illustrates a magnified side cross-sectional view of an axial protrusion and annular channel of the retaining member of FIG. 6B; and FIG. 6D illustrates an embodiment of the retaining member of the secondary piston assembly of the damper according to the present invention in a back view.

DETAILED DESCRIPTION OF THE PREFERRED EMBODIMENTS

Reference numerals to functionally equivalent elements remain the same on all figures of the drawing, wherein where appropriate, they are supplemented with additional suffixes (a, b) to differentiate elements of the same functionality but different construction.

FIG. 1 presents an embodiment of a twin-tube damper 1a according to the present invention that may be employed in a typical motor vehicle suspension. The damper 1a comprises an external tube 2 and a main tube 3 filled with viscous working liquid. A movable main piston assembly 4 is disposed in the main tube 3. The main piston assembly 4 is attached to a main piston rod 5 led outside the damper 1a through a sealed piston rod guide 6. The damper 1a is also provided with a base valve assembly 7 fixed at the other end of the main tube 3. The main piston assembly 4 is slideably positioned against the inner surface of the main tube 3 and divides the tube 3 into a rebound chamber 11 (above the main piston assembly 4) and a compression chamber 12 (between the main piston assembly 4 and the base valve assembly 7). An additional compensation chamber 13 is located at the other side of the base valve assembly 7.

The main piston assembly 4 is provided with a compression valve assembly 42 and a rebound valve assembly 41 to control the flow of working liquid passing between the rebound chamber 11 and the compression chamber 12 while the main piston assembly 4 is in motion. The base valve assembly 7 is provided with a rebound valve assembly 71 and a compression valve assembly 72 to control the flow of working liquid passing between the additional compensation chamber 13 and the compression chamber 12, respectively, during rebound and compression strokes of the damper 1a. Valve assemblies 41, 42 and 71, 72 provide design parameters that may be used to shape desired characteristic of the damper 1a.

Main section 33 of the tube 3 has a first diameter D1, which in the disclosed embodiment is approximately 32 mm. As shown, the tube 3 also has a narrowed cylindrical section 31 of a second diameter D2 that is smaller than the first diameter D1, which in this embodiment is approximately 28 mm. This narrowed cylindrical section 31 has a form of an insert 35 provided with a conical section 32 that extends into the main cylindrical section 33 of the tube. Furthermore, the insert 35 is provided with six axial slots 36, each having an arched axial cross-sectional surface that decreases from the conical section 32 further along the insert 35 forming a slot section 361, thus enabling a flow of a working liquid through the slots 36. Such a shape of the slots provides smooth build-up of the damping force between the main cylindrical section 33 and the narrowed cylindrical section 31 of the tube 3.

A secondary piston assembly 8 is displaceable with the main piston assembly 4 and is coaxially fixed with the main piston assembly 4 by means of a secondary rod 81 screwed onto the threaded end of the main piston rod 5. A third diameter D3 of the secondary piston assembly 8 is smaller than the first diameter D1 of the main section 33 of the tube 3, so that an annular channel 331 is defined over the perimeter of the secondary piston assembly 8 for a free flow of working liquid while the piston assembly 8 is located within the main section 33 of the tube 3.

Such shapes of the main tube 3 and the secondary piston assembly 8 provide a hydraulic compression stop for the damper 1a that shall be explained later, in particular with reference to FIGS. 3A and 3B and FIGS. 4A and 4B.

FIG. 2 presents another embodiment of a mono-tube damper 1b according to the present invention with a hydraulic rebound stop of a construction similar to the one illustrated in FIG. 1. As shown in FIG. 2, a narrowed cylindrical section 31 of a damper tube 3 is located at the rebound end of the tube 3 and a secondary piston assembly 8 is fixed to the main piston rod 5 at the rebound side of the main piston assembly 4.

In this embodiment, the conical section 32 of the tube 3 is separated with six equiangularly spaced axial slots 36 stamped from the outside of the tube 3 and separated with six axial bridges 37. As a result, the conical section 32 of the tube 3 comprises a semi-cylindrical slot section 361 formed by six equiangularly spaced cylindrical sections of the bridges 37, and a semi-conical section 32 formed by six equiangularly spaced conical sections of the bridges 37. Semi-cylindrical slot section 361 provides guidance for the secondary piston assembly 8 while retaining the slots 36.

As known to those skilled in the art, a slidable diaphragm 9 separates the damper compression chamber 12 from an additional gas compensation chamber 14. The tube comprises a cap 34 screwed on the end of the main tube 3 and is provided with a valve 341 which provides for filling the additional gas compensation chamber 14 with gas after assembly of the damper.

A damper according to the present invention may contain two hydraulic stops both at the compression and at the rebound side.

FIGS. 3A and 3B and FIGS. 4A and 4B illustrate the operation of a hydraulic compression stop in the embodiment of the twin-tube damper 1a shown in FIG. 1 during compression and rebound strokes.

As shown in FIG. 3A, the secondary piston assembly 8 comprises a secondary rod 81 provided with a main body portion 813 and an axial extension portion 812 extending axially from the main body portion 813. The axial extension portion 812 has a smaller diameter than the main body portion 813. An abutment surface 815 is defined radially between the main body portion 813 and the axial extension portion 812. An annular projecting portion 811 extends radially outwardly from the main body portion 813. A spring seat 82 is slidably disposed over the secondary rod 81, and a spring 83 is compressed between the secondary rod 81, annular projecting portion 811 and the spring seat 82. A secondary piston 84 is provided with an annular projection 844 (cf. FIGS. 5A-5D) having a plurality of equiangularly spaced axial slots 841, and an axial projection 842 is fixed on the narrowed axial extension portion 812 of the secondary rod 81 (providing an abutment surface) by means of a retaining member 85 in a form of a slotted nut 85 screwed on the narrowed axial extension portion 812 of the secondary rod 81. The retaining member 85 presents an outer face and defines a plurality of spaced radial slots 851 that extend radially inwardly into radial alignment with the axial slots 841 of the secondary piston 84. The secondary piston 84 abuts the spring seat 82. A split sealing ring 86 is loosely disposed over the secondary piston 84, axial projection 842 and between the secondary piston 84, annular projection 844 and the slotted nut 85, so that an annular channel 861 is defined between the secondary piston 84 axial projection 842 and the radially inner surface of the sealing ring 86.

The sealing ring 86 provides sealing while the piston assembly 8 moves within the narrowed section 31 of the tube 3. Due to the split of the sealing ring 86 (not shown), the external diameter D3 of the secondary piston assembly 8 is slightly larger than the diameter D2 of the narrowed cylindrical section 31 while the piston assembly 8 moves within the main section 33. In this embodiment the external diameter D3 of the secondary piston assembly 8 amounts about 28.3 mm.

During the compression stroke of the secondary piston assembly 8 through the conical section 32, the working liquid flows out of the narrowed section 31 through the slots 36 and around the secondary piston assembly 8 to the main section 33 of the tube 3, as well as through the open compression valve assembly 42 of the main piston assembly 4, as illustrated with dashed arrows.

The sealing ring 86 squeezes to form a sealed engagement with the inner surface of the narrowed section 31, and in this movement is pushed away from the slotted nut 85 due to the working liquid pressure. Some amount of the liquid also enters from below the sealing ring 86 through the annular channel 861 and axial slots 841 of the secondary piston 84, but its pressure acting on the spring seat 82 is insufficient to compress the spring 83.

As shown in FIG. 3b, when the secondary piston assembly 8 moves further inside the narrowed section 31 and below the slot section 361, the working liquid is no longer (cf. FIG. 3A) able to bypass through the slots 36. From this moment the working liquid pressure builds rapidly under the spring seat 82, and at a certain threshold, can be tuned among others by the compression strength of the spring 83. The liquid pressure forces the spring to yield, thus allowing the liquid to bypass through the annular channel 861 of the sealing ring 86, axial slots 841 of the secondary piston 84, annular channel 821 between the spring seat 82 and annular seats 8411 (cf. FIGS. 5A-5D)) of the axial slots 841 of the secondary piston 84, and further to the compression chamber 12 through the slots 36. In the disclosed embodiment, the spring activation threshold amounts to about 6500 N. Obviously, the height of the annular channel 821 depends on the pressure of the liquid acting on the spring seat 82.

When the stroke of the damper changes to rebound as shown in FIG. 4a, the spring 83 presses the spring seat 82 back to the secondary piston 84, and the pressure of the working liquid, as well as certain friction between the sealing ring and the narrowed section 31 or the slot section 361 pushes the sealing ring 86 to the slotted nut 85. In this position, the annular channel 821 of the spring seat 82 (cf. FIG. 3b) is closed, but the liquid may flow to the narrowed section 31 through the slots 36, an annular channel 843 between the secondary piston 84 annular projection 844 and the sealing ring 86, annular channel 861 of the sealing ring 86 and finally through the radial slots 851 of the slotted nut 85, as illustrated with dashed arrows.

Finally, as shown in FIG. 4b, when the secondary piston assembly 8 leaves the narrowed section 31 of the tube 3, the working liquid may freely flow also around the sealing ring 86 through the annular channel 331.

As shown in FIGS. 5A-5D, the annular projection 844 of the secondary piston 84 is provided with eight equiangularly spaced axial slots 841 having substantially trapezoidal cross-sections, the number of and shape of which are the parameters that can be adjusted to fine-tune the functionality of the hydraulic stop of the present invention. Additionally, the slots at the face abutting the spring seat 82 are provided with axially protruding annular seats 8411 that reduce pressure area working at the spring seat 82 loaded by the spring 83 and in turn allow for using more feasible stiffness spring 83.

As shown in FIGS. 6A-6D the slotted nut 85 is provided with four equiangularly spaced radial slots 851 formed between four axial protrusions 852. An annular channel 853 joins radially internal openings of the slots 851 and enables for an efficient liquid communication with the annular channel 821 of the spring seat 82 during the rebound stroke while the secondary piston assembly 8 is in the narrowed section 31 of the tube 3. As shown in FIG. 6D the other side of the slotted nut 85 is provided with a torque application hexagonal surface 854 enabling for screwing an internal thread 855 of the nut 85 on an external thread 8121 of the narrowed axial extension portion 812 of the secondary rod 81 and thus for fixing all the components of the secondary piston assembly 8.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A hydraulic damper for a motor vehicle comprising:
   a tube extending along an axis and defining a chamber for holding a fluid;
   said tube having a main section having a first diameter and a narrowed section having a second diameter being smaller than said first diameter;
   a main piston assembly slidably disposed inside said main section of said tube;
   a main piston rod attached to said main piston assembly and extending axially outside of said tube;
   a secondary rod coupled with and extending axially from said main piston rod;
   a spring seat disposed about said secondary rod and axially moveable relative to said secondary rod;
   a spring engaging said spring seat and preloading said spring seat in a direction opposite said main piston assembly;
   a secondary piston disposed about and coupled with said secondary rod;
   said secondary piston having an axial projection and an annular projection, wherein said axial projection extends axially and wherein said annular projection extends radially outwardly relative to said axial portion and abuts said spring seat and defines a plurality of axial slots extending axially therethrough;
   a retaining member coupled with said secondary rod on the axially opposite side of said secondary piston as said spring seat and having an outer face defining a plurality of spaced radial slots extending radially inwardly into radial alignment with said axial slots of said secondary piston;
   a sealing ring having an external diameter substantially corresponding to the second diameter and disposed about said axial projection axially between said annular projection and said retaining member and axially moveable relative to said axial projection;
   an annular channel defined radially between said sealing ring and said axial projection; and
   said sealing ring being axially moveable between a first position and a second position, wherein said sealing ring engages said annular projection in said first position to fluidly connect said annular channel with said axial slots of said annular projection, and wherein said sealing ring engages said retaining member in said second position to fluidly connect said annular channel with said radial slots of said retaining member.

2. A hydraulic damper as set forth in claim 1 further including a plurality of annular seats each extending axially from said axial projection and surrounding one of said axial slots.

3. A hydraulic damper as set forth in claim 1 wherein said secondary piston is fixed to said secondary rod.

4. A hydraulic damper as set forth in claim 3 wherein said secondary rod includes a main body portion and an axial extension portion extending axially from said main body portion; wherein said axial extension portion has a smaller diameter than said main body portion; wherein an abutment surface is defined radially between said main body portion and said axial extension portion; and wherein said secondary piston engages said abutment surface.

5. A hydraulic damper as set forth in claim 4 wherein said axial extension portion of said secondary rod presents external threads, and wherein said retaining member is a nut threadedly secured to said external threads of said axial extension portion.

6. A hydraulic damper as set forth in claim 1 further including an annular projection extending radially outwardly from said secondary rod, and wherein said spring engages said annular projection.

7. A hydraulic damper as set forth in claim 1 wherein said hydraulic damper is a twin tube damper.

8. A hydraulic damper as set forth in claim 1 wherein said tube extends axially between a rebound end and a compression end, and wherein said narrowed section of said tube is located at said compression end of the said tube.

9. A hydraulic damper as set forth in claim 8 further including an insert disposed in said compression end of said tube, wherein said insert defines said narrowed section of said tube.

10. A hydraulic damper as set forth in claim 1 wherein said narrowed section of said tube defines at least one slot extending axially.

* * * * *